United States Patent [19]

Tsukagoshi et al.

[11] 4,366,205
[45] Dec. 28, 1982

[54] TONE-ARM ELEMENTS

[75] Inventors: Tsunehiro Tsukagoshi; Shinichi Yokozeki; Sumio Hagiwara; Masataka Uchidoi; Toshikazu Yoshino; Yasuyuki Arai, all of Tokorozawa, Japan

[73] Assignee: Pioneer Electronic Corporation, Tokyo, Japan

[21] Appl. No.: 244,897

[22] Filed: Mar. 18, 1981

[30] Foreign Application Priority Data

Mar. 31, 1980 [JP] Japan ................... 55-40266

[51] Int. Cl.³ .................... B32B 5/00; B32B 9/00
[52] U.S. Cl. .................... 428/338; 428/408; 524/431
[58] Field of Search ............ 428/402, 404, 408, 338, 428/523; 260/42, 46; 369/158, 244, 247, 256; 524/431

[56] References Cited

U.S. PATENT DOCUMENTS

| 3,923,697 | 12/1975 | Ellis | 524/431 |
| 4,199,628 | 4/1980 | Caines | 428/408 |
| 4,254,184 | 3/1981 | Tsukagoshi et al. | 428/408 |
| 4,261,580 | 4/1981 | Tsukagoshi et al. | 428/36 |
| 4,269,416 | 5/1981 | Yoshino et al. | 428/408 |
| 4,282,288 | 8/1981 | Yoshino et al. | 428/408 |

FOREIGN PATENT DOCUMENTS 1911303 9/1970 Fed. Rep. of Germany ...... 428/408

Primary Examiner—William J. Van Balen

[57] ABSTRACT

Elements for a tone-arm system such as arm pipes, head shells, cartridge bodies, and arm bases are fabricated from a kneaded mixture comprising polypropylene and flaky graphite powder. The mixture may further include polymethyl methacrylate and/or rubber-like material. Graphite flakes are preferably oriented parallel to the surface of the element. The elements show improved temperature resistance.

10 Claims, 16 Drawing Figures

TONE-ARM ELEMENTS

BACKGROUND OF THE INVENTION

This invention relates to tone-arm elements, and more particularly, to those elements constituting the non-vibration system of a tone-arm for a record player, such as tone-arm pipes, cartridge bodies, head shells, arm bases and the like.

To enhance the trackability of a cartridge, it is desirable to reduce the mass of a cartridge-supporting or non-vibration system while obtaining an increased internal loss to prevent partial vibration. The mass of a tone-arm system may be reduced simply by making an arm pipe, a head shell and other tone-arm elements lighter. However, if wall thickness is reduced for this purpose, a correspondingly reduced stiffness tends to cause unwanted partial vibration, debasing the sound quality reproduced through such a tone-arm system. There is a need for arm pipes, head shells and cartridge bodies formed from a light-weight material which has a high stiffness or high modulus of elasticity as well as a sufficient internal loss.

Those arm pipes and head shells formed from a conventional metallic material such as aluminum, titanium, beryllium, etc. are not satisfactory due to poor internal loss (damping) though they have a high modulus of elasticity. Also known are arm pipes and head shells formed from fibrous carbon materials which are physically excellent as they have a high specific modulus of elasticity and a relatively large internal loss. However, carbon fibers must be compounded with a synthetic resin before arm pipes or head shells can be molded therefrom. Such composite carbon fiber-resin materials show a reduced specific modulus of elasticity.

Recently, the inventors proposed arm pipes and head shells molded from a kneaded mixture of polyvinyl chloride and flaky graphite powder and having advantages of light weight, high elasticity and high internal loss as disclosed in U.S. Ser. No. 147,866 (filed May 8, 1980). The proposed tone-arm elements have improved properties which are not found in prior art materials or elements. In various applications of the previously proposed material, the inventors encountered a problem that these elements are still insufficient in heat resistance. These elements tend to be deformed particularly when exposed to the sun in summer or used in the tropics.

SUMMARY OF THE INVENTION

It is therefore an object of the present invention to provide an improved tone-arm element which is satisfactory in temperature resistance as well as having excellent qualities of light weight, high elasticity and sufficient internal loss.

According to a first aspect of the present invention, there is provided a tone-arm element fabricated from a kneaded mixture mainly containing polypropylene and flaky graphite powder.

BRIEF DESCRIPTION OF THE DRAWINGS

These and other objects, features and advantages of the present invention will be more fully understood from the following description taken in connection with the accompanying drawing in which.

DESCRIPTION OF THE PREFERRED EMBODIMENT

Figure 1:
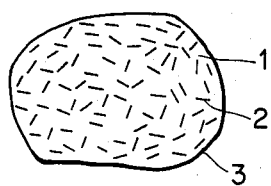
FIG. 1 is a cross-sectional view of a kneaded mass of graphite flakes in a resin matrix from which a tone-arm element is fabricated according to the present invention.

The tone-arm element according to the present invention is fabricated from a kneaded mixture mainly containing polypropylene and flaky graphite powder. The resin component may be polypropylene alone or in admixture with polymethyl methacrylate (PMMA).

Polypropylene which can be used herein may be propylene homopolymers and block and random copolymers of propylene with ethylene or any other comonomers. These propylene polymers may be prepared by any of well-known methods and are commercially available.

Preferred examples of polymethyl methacrylate are those having a softening point above 90° C.

Further, a rubber-like material may also be added to the polypropylene. It is also contemplated in the present invention to add both a rubber-like material and polymethyl methacrylate to the polypropylene. Examples of the rubber-like material are acrylonitrile-butadiene rubber (NBR), butyl rubber (IIR), styrene-butadiene rubber (SBR), etc. It is to be understood that the rubber-like materials contribute to a further improvement in internal loss.

In general, the modulus of elasticity of a resin gradually decreases as the surrounding temperature is raised. The temperature at which modulus of elasticity decreases to one-half of the original value at room temperature is referred to as half-modulus temperature in this specification. When the half-modulus temperatures of resins of interest are compared, the half-modulus temperature of polypropylene is higher by about 25 degrees Centigrade than that of normal PVC, and PMMA is higher by 10 degrees Centigrade than the latter. Accordingly, molding materials comprising flaky graphite powder, polypropylene and optionally, PMMA have a higher half-modulus temperature and hence, improved temperature resistance as compared with the previous PVC-based molding materials.

The flaky graphite powder contributes to an improvement in modulus of elasticity, which cannot be expected in the case of resin components per se. The modulus of elasticity is substantially increased when graphite flakes are oriented in one direction, preferably parallel to the surface of a molded product. Graphite flakes have a thin disc- or platelet-form and preferably have an average particle size of about 0.1 to about 20 microns, particularly about 0.1 to about 5 microns. An improvement in modulus of elasticity attributable to graphite flakes and satisfactory moldability can be expected and such moldings are free of embrittlement when about 10 to 90 parts by weight of graphite powder is combined with 90 to 10 parts by weight of the resin component. An outstanding improvement is achieved when about 50 to 75 parts by weight of graphite powder is combined with about 50 to 25 parts by weight of the resin component.

PMMA is widely used with polypropylene as its processing aid and the amount of PMMA to be added may be varied in the range of 1–30%, preferably 10–25% by weight of the polypropylene, depending on the shape and properties of the intended product. The rubber-like materials may be added in an amount of about 2 to 50 parts per 100 parts by weight of the resin component. The addition of about 10 pph of the rubber-like material will result in a 20% reduction of modulus of elasticity while internal loss is increased about 1.5 to 2.0 times.

The present invention will be more fully understood by referring to the preferred embodiments in conjunction with the drawing.

Tone-arm elements may be fabricated by first mixing flaky graphite powder with a resin component which may be polypropylene alone or its admixture with polymethyl methacrylate and an optical rubber-like material. Also, a plasticizer and/or stabilizer may optionally be added. The thus obtained mixture is fully kneaded by means of a conventional kneader or roll mill while heating to a temperature of 190°–210° C. at which the resins will soften or melt. The kneaded mass is designated at 3 in FIG. 1 as containing graphite flakes 2 in a resin matrix 1. As seen from FIG. 1, graphite flakes 2 are randomly distributed throughout the resin matrix 1.

Figure 2A:
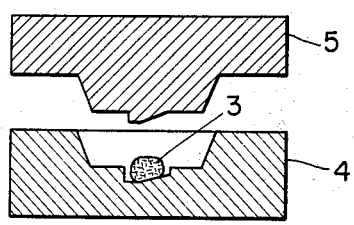
FIGS. 2a, 2b and 2c illustrate successive steps of molding a tone-arm element.
Figure 2B:
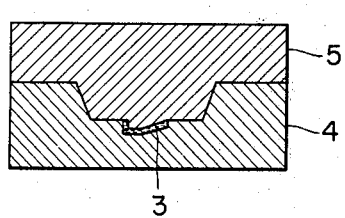
Figure 2C:
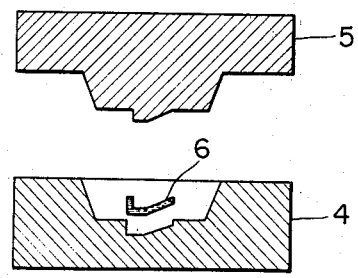

The kneaded mixture 3 is ready for use in molding. Tone-arm elements such as head shells, arm bases and cartridge bodies may be directly molded from the kneaded material 3 by any suitable molding methods including compression molding, injection molding and press molding. A process of compression molding, for example, is illustrated in FIG. 2. Upper and lower mold halves 4 and 5 define a cavity having a configuration corresponding to the shape of a desired tone-arm element, when mated together. A portion of the kneaded material 3 is placed on the cavity-defining surface of the lower mold half 4 to compress the material while heating, allowing the material to flow throughout the cavity. Thereafter, the mold halves 4 and 5 are cooled and then separated. The molded element 6 is then removed.

Figure 3A:
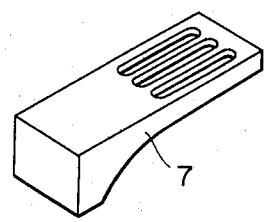
FIGS. 3a, 3b and 3c are perspective views of a head shell, a cartridge body and an arm base embodying the tone-arm element of the present invention.
Figure 3B:
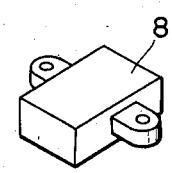
Figure 3C:
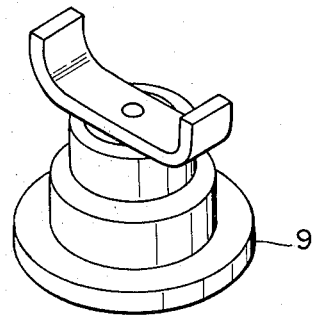

The molded element 6 may take the form of a head shell 7, a cartridge body 8, and an arm base 9 shown in FIGS. 3a, 3b, and 3c, respectively.

The kneaded material 3 containing randomly distributed graphite flakes or the element 6 molded therefrom has a modulus of elasticity which is about ½ or ⅓ of that of a material of the same composition, but having the graphite flakes oriented. However, their internal losses are equal independent of graphite orientation. Elements molded from a kneaded material containing randomly distributed graphite flakes are suitable as elements constituting a tone-arm system which need not vibrate at a high reproduction frequency range, but must have sufficient damping characteristics to externally induced low-frequency range vibrations and vibration due to a warped record.

Figure 4:
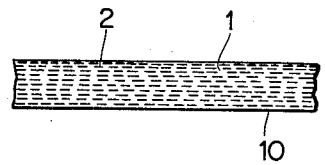
FIG. 4 is a cross-sectional view of a rolled sheet in which graphite flakes are oriented parallel to the surface according to a preferred embodiment of the present invention.

In another embodiment requiring an increased modulus of elasticity, the kneaded material 3 is repeatedly rolled by means of a roll mill into a sheet 10 as shown in FIG. 4. The rolling of the kneaded material causes the graphite flakes 2 to be oriented parallel to the surface of the sheet 10. As a result of graphite orientation, the modulus of elasticity of the rolled sheet is increased two to three times over kneaded materials containing randomly distributed graphite flakes. The sheet 10 or a laminate of two or more sheets 10 if desired may be fabricated into a tone-arm element of a desired shape by any suitable method including vacuum forming, air-pressure forming or press molding while heating.

Figure 5A:
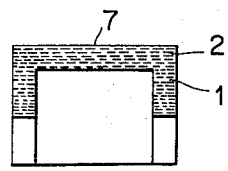
FIGS. 5a and 5b are transverse and longitudinal cross-sections of the head shell shown in FIG. 3a, graphite flakes being oriented.
Figure 5B:
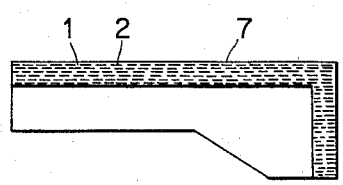

In fabricating a head shell as shown in FIG. 3a, a plurality of sheets 10 are laminated to a desired thickness and the laminate is press molded between upper and lower mold halves. The resulting head shell 7' exhibits a high stiffness and a high modulus of elasticity as graphite flakes 2 are oriented parallel to the surface of the shell as shown in FIGS. 5a and 5b.

Figure 8:
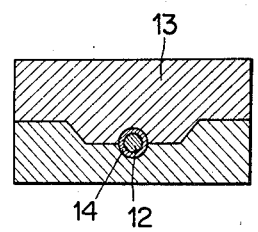
FIG. 8 is a cross-sectional view of a mold in which an arm pipe is being press molded.
Figure 6:
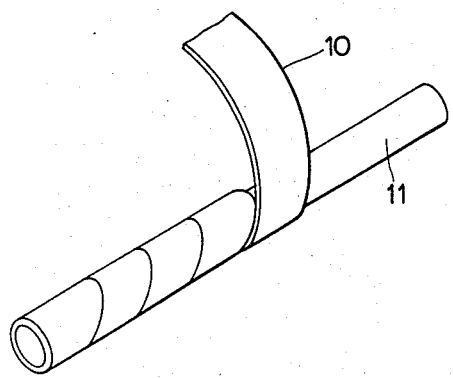
FIG. 6 illustrates one embodiment of the arm pipe fabricating process in which a strip of rolled molding material is wound on a core.
Figure 7:
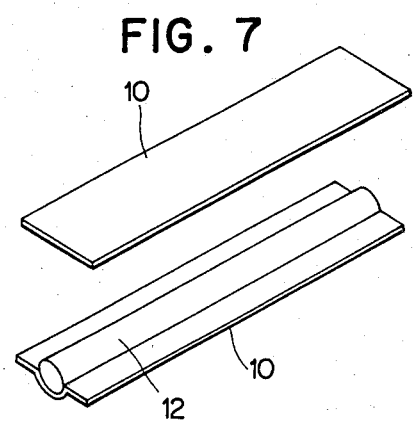
FIG. 7 illustrates another embodiment of the arm pipe fabricating process in which a core is sandwiched between two sheets.
Figure 9:
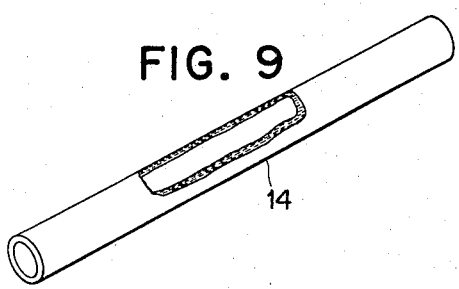
FIG. 9 is a perspective, partially cut-away, view of the arm pipe.
Figure 10A:
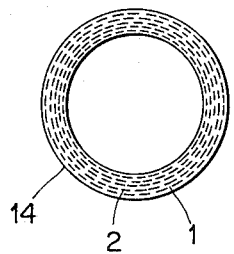
FIGS. 10a and 10b are transverse and axial cross-sections of the arm pipe shown in FIG. 9.
Figure 10B:
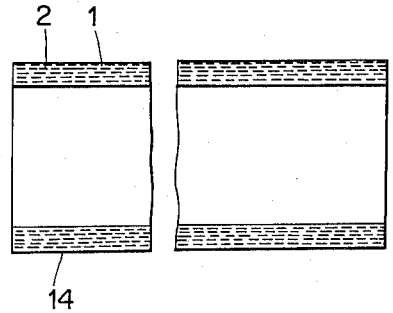

In general, an arm pipe should bear a relatively large load or should have a high stiffness and modulus of elasticity as it is equipped with a balance weight and a head shell and is to be manually manipulated by the operator. Therefore, the arm pipe is preferably fabricated from the sheet 10 having graphite flakes oriented. The arm pipe may be fabricated by spirally winding a strip cut from the sheet 10 around a core 11. The tightly wound strip is heated to cause heat bonding of adjoining edges. Alternatively, a sandwich assembly of a core 12 between two sheets 10 is subjected to pressure forming at elevated temperatures in a press mold 13 as shown in FIGS. 7 and 8. The thus fabricated tone-arm pipe is designated at 14 in FIG. 9. In this arm pipe 14, graphite flakes 2 are oriented parallel to the surface of the pipe or both in the axial and the circumferential directions as shown in FIGS. 10a and 10b.

Examples of the present invention are described below.

EXAMPLE 1

|  | Parts by weight |
|---|---|
| Polypropylene | 100 |
| Flaky graphite powder | 200 |

EXAMPLE 2

|  | Parts by weight |
|---|---|
| Polypropylene | 100 |
| Flaky graphite powder | 300 |

EXAMPLE 3

|  | Parts by weight |
|---|---|
| Polypropylene | 80 |
| Polymethyl methacrylate | 20 |

-continued

| | Parts by weight |
|---|---|
| Flaky graphite powder | 250 |

EXAMPLE 4

| | Parts by weight |
|---|---|
| Polypropylene | 100 |
| IIR | 10 |
| Flaky graphite powder | 200 |

EXAMPLE 5

| | Parts by weight |
|---|---|
| Polypropylene | 80 |
| Polymethyl methacrylate | 20 |
| IIR | 10 |
| Flaky graphite powder | 250 |
| Control | |
| Polyvinyl chloride | 100 |
| Flaky graphite powder | 200 |
| Lead stearate (stabilizer) | 5 |
| Dioctyl phthalate (plasticizer) | 10 |

In each Example, power ingredients were fully kneaded in a kneader at a temperature of 190°–210° C. using the above-mentioned formulation. A portion of the thus kneaded material was rolled several times by means of a twin-roll mill, obtaining a sheet in which graphite flakes were oriented parallel to the surface. Samples of the kneaded materials and rolled sheets were determined for their physical properties. The results are shown in the following Table.

TABLE

| Example | Graphite distribution | Modulus of elasticity $E (\times 10^{10} N/m^2)$ | Density $\rho$ ($\times 10^3 kg/m^3$) | Internal loss $\tan \delta$ | Half-modulus temperature* (°C.) |
|---|---|---|---|---|---|
| 1 | random | 1.6 | 1.47 | 0.05 | 80 |
| 1 | oriented | 3.2 | 1.47 | 0.05 | 80 |
| 2 | random | 2.5 | 1.60 | 0.04 | 80 |
| 2 | oriented | 4.3 | 1.60 | 0.04 | 80 |
| 3 | random | 2.0 | 1.55 | 0.04 | 80 |
| 3 | oriented | 3.8 | 1.55 | 0.04 | 80 |
| 4 | random | 1.25 | 1.45 | 0.07 | 80 |
| 4 | oriented | 2.50 | 1.45 | 0.07 | 80 |
| 5 | random | 1.5 | 1.52 | 0.06 | 80 |
| 5 | oriented | 3.0 | 1.52 | 0.06 | 80 |
| Control | random | 2.2 | 1.8 | 0.03 | 55 |
| Control | oriented | 6.0 | 1.8 | 0.03 | 55 |
| Aluminum | | 7.1 | 2.7 | 0.003 | — |
| Kraft paper | | 0.2 | 0.6 | 0.05 | — |

*Temperature at which modulus of elasticity is reduced to one-half of the initial value when the temperature is raised from room temperature.

Various tone-arm elements were fabricated from the kneaded mixture and the rolled sheet of each Example. Particularly, head shells, cartridge bodies and arm bases were compression molded from the kneaded mixture having randomly distributed graphite flakes. Head shells, arm pipes and arm bases were vacuum formed from the rolled sheet having graphite flakes oriented.

The thus obtained tone-arm elements are light weight or have a low density as the molding material is based on the synthetic resin and graphite. They show sufficient internal loss due to the crystalline structure of graphite and the softness of the rubber-like material when used. Further, those tone-arm elements in which the graphite flakes are oriented exhibit a significantly increased stiffness and modulus of elasticity. That is, tone-arm elements having sufficient internal loss can be fabricated without losing physical strength. In addition, the tone-arm elements of the present invention are satisfactorily heat resistant as proved by a heat distortion temperature of above 120° C.

What we claim:

1. A tone-arm element fabricated from a kneaded mixture comprising polypropylene, polymethyl methacrylate and flaky graphite powder.

2. The tone-arm element according to claim 1 wherein the kneaded mixture further contains a rubber-like material.

3. The tone-arm element according to claim 2 wherein said rubber-like material is selected from the group consisting of acrylonitrile-butadiene rubber, butyl rubber and styrene-butadiene rubber.

4. The tone-arm element according to any one of claims 1, 2 or 3 wherein the graphite flakes of said powder are oriented substantially parallel to the surface of the element.

5. A tone-arm element according to claim 1 wherein said kneaded mixture contains 90 to 10% by weight of polypropylene and 10 to 90% by weight of flaky graphite powder and based on the weight of the polypropylene 1–30% by weight of polymethyl methacrylate and 2–50% by weight of a rubber-like material.

6. The tone-arm element according to claim 5 wherein said kneaded mixture contains 50 to 25% by weight of polypropylene and 50 to 75% by weight of flaky graphite powder.

7. The tone-arm element according to claim 5 wherein the graphite flakes have a particle size of 0.1 to about 20 microns.

8. The tone-arm element according to claim 7 wherein the graphite flakes have a particle size of 0.1 to about 5 microns.

9. The tone-arm element according to claim 1 wherein the element is fabricated directly from the kneaded mixture by compression molding, injection molding or press molding.

10. The tone-arm element according to claim 1 wherein the element is fabricated by rolling the kneaded mixture into a sheet and then forming the sheet into a desired shape by way of vacuum forming, air-pressure forming or press molding.

* * * * *